Figure 1:
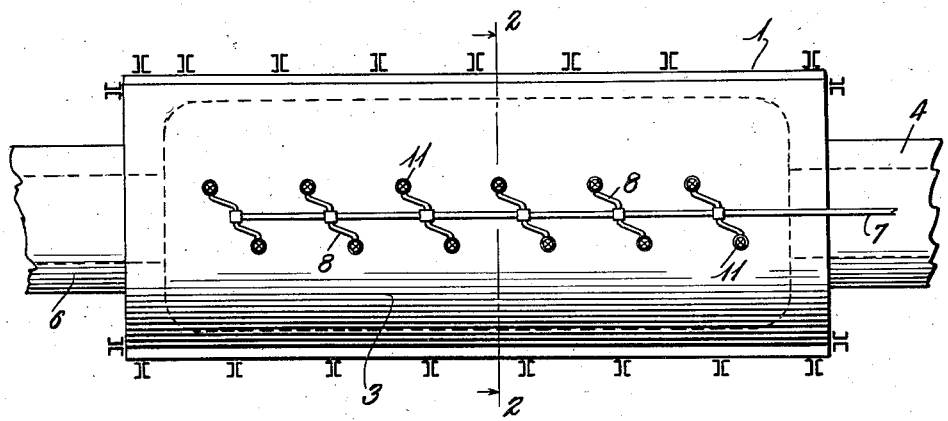

Oct. 13, 1936.    K. M. SIMPSON    2,057,065
HEATING PROCESS
Filed July 1, 1935

Inventor
Kenneth M. Simpson

By Bacon + Thomas
Attorney

Patented Oct. 13, 1936

2,057,065

UNITED STATES PATENT OFFICE 2,057,065

HEATING PROCESS

Kenneth M. Simpson, New York, N. Y., assignor to International Chromium Process Corporation, New York, N. Y., a corporation of Delaware Application July 1, 1935, Serial No. 29,355

6 Claims. (Cl. 263—52)

My invention relates to a heating process and more particularly has reference to improvements in the operation of open hearth furnaces.

The invention is particularly useful in the art of metallurgy for the production of steel, iron, ferrochrome, and other metals and alloys, although it is not limited to these fields.

Although the present invention contemplates the use of liquid fuels, such as hydrocarbon oils, it is of special utility in the burning of fuel gases, either natural or manufactured.

In the burning of gaseous fuel in a conventional manner of operating open hearth furnaces, the fuel gas is admitted to the furnace through a port in the end thereof and passed through the furnace in a generally horizontal direction. Preheated air for combustion is introduced through a relatively large port above the gas port in the end of the furnace, the amounts of fuel and air being so proportioned as to effect as nearly complete combustion as possible during the passage of the mixture through the furnace. The air port is so built as to direct the flow of air slightly downward in order to hold the lighter or lower specific gravity fuel gas down by the weight of the superimposed air and also to effect the best possible admixture as the fuel and air travel through the furnace.

This method of operation presents certain difficulties. The fuel gas employed, particularly natural gas, has a considerably lower specific gravity than air and products of combustion. As a consequence the fuel gases and the flame generated therefrom tend to rise away from the hearth and the material being heated thereon and therefore to diminish the efficiency of the operation. There is the further tendency of the gas to burn adjacent the furnace roof and cause rapid deterioration of the latter.

It is accordingly an object of the present invention to overcome these difficulties or disadvantages in the operation of open hearth furnaces primarily employing gaseous fuels.

According to the present invention, this protection of the furnace roof against intense heat and the more efficient operation are obtained by effecting the actual flame generation adjacent the hearth, or at least not close to the roof, and by providing a sweeping body of air as a heat insulator between the roof and the burning fuel.

In my prior Patent No. 1,812,563, I have disclosed and claimed a heating process wherein the charge of material on the hearth is heated by flame impingement against the surface thereof. According to the specific operation illustrated in the patent, the flames are generated by means of burners mounted in the furnace roof or arch and are directed downwardly onto the charge under high velocity.

It is a further object of the present invention to improve the heating process of my prior patent referred to in order better to adapt the process to the burning of gaseous fuels and to obtain all the desirable results thereof in a more simplified structure by the elimination of the necessity for burners in the upper portion of the furnace, the elimination of the burners having the further advantage that the arch of the furnace is less susceptible to the deteriorating influences of the intense heat of the burning fuel.

Other objects and advantages of the present process will be apparent from the more detailed description thereof.

In the process of this invention, the air for combustion is admitted through a port in the end of the furnace in a horizontal or slightly downward direction, as in the known open hearth furnace operation heretofore referred to. The fuel gas, however, is introduced under considerable pressure by means of orifices projecting through the furnace roof, the pressure being sufficient to project streams of the gas downwardly through the rapidly moving body of air, mixed with the products of combustion, and to cause the fuel to burn while impinging on the charge disposed upon the hearth. The pressure of the fuel gas may vary from 2 pounds to 100 pounds per square inch, being determined by the distance from the orifices to the hearth, the size of the orifices and the velocity of the body of moving gas. The velocity of the gas jets is higher than the rate of flame propagation while the number of orifices or gas jets is dependent on the size of the hearth and the combustion conditions desired. Preferably the number of gas jets is such as to cover the entire surface of the charge with flame as in my prior patent referred to. In medium sized open hearth furnaces approximately twenty jets may be used.

Figure 2:
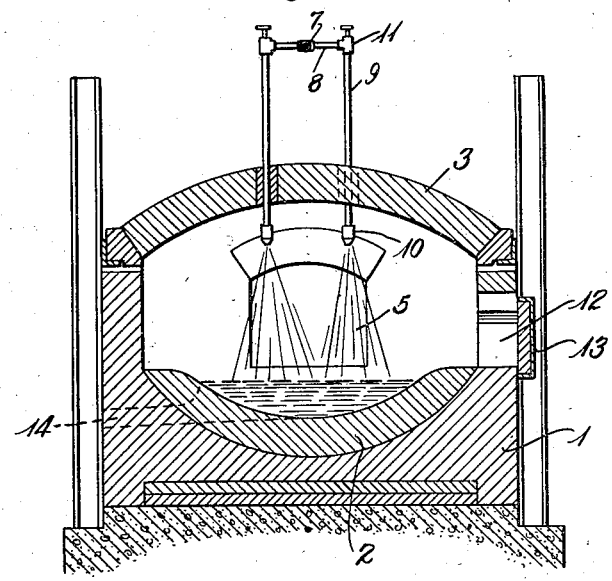

For a more detailed understanding of the invention, reference will be had to the accompanying drawing wherein Figure 1 is a plan view of an apparatus capable of carrying out the process, and Figure 2 is a section view on the line 2—2 of Figure 1 and showing the charge in the melted form.

Referring more particularly to the drawing, at 1 is shown a furnace of the open hearth type, having the usual hearth 2 and arched roof 3.

The air inlet conduit 4 leads from a regenerator of any known construction and terminates in an air inlet port at one end of the furnace. A discharge conduit, 6, for combustion products is provided at the opposite end of the furnace. The arrangement is such as to permit the use of regenerators and the alternate introduction of air to and discharge of combustion products from each end of the furnace, as in the customary open hearth furnace operation.

A fuel feeding manifold 7 communicates, through branches 8, with each of the fuel inlet pipes 9 projecting through arch 3 into the furnace and terminating in orifices or nozzles 10. Each fuel pipe 9 is provided with a valve 11 for independently controlling the fuel supply to the several orifices. The fuel inlet pipes are spaced throughout the furnace roof in sufficient number to cover the charge on the hearth with flame. The material to be heated is supplied to the furnace through opening 12 having closure 13 and the molten material is discharged from the furnace through outlet 14.

In operation, a charge of the material to be heated having been placed upon the hearth, gaseous fuel, such as natural gas, is forcibly projected downwardly toward the hearth from orifices 10 while introducing air through port 5 in a horizontal or slightly downward direction, the fuel and air being suitably proportioned to obtain proper combustion. The fuel gases are projected downwardly with sufficient pressure to penetrate the moving stream of air and combustion products and to forcibly impinge upon the charge, being burned while thus impinging against the surface of the material undergoing heating. Preferably the entire charge is blanketed with flame thus generated near the surface thereof.

The forceful projection of the gas streams downwardly under pressure overcomes the tendency of the gas to rise in the furnace and burn against the roof thus avoiding intense heating of the latter. The furnace roof is further protected from the intense heat of the burning fuel by the insulating action of the body of air between the roof and the flame being generated adjacent the hearth. The burning of the gas directly on and while impinging against the charge produces an efficient melting condition and, as in my prior patent referred to, the covering of the charge with downwardly impinging flames brings about rapid melting. The rate of furnace output is further increased by reason of the fact that the fuel gas can be burned more rapidly in downwardly directed jets than in the known processes for burning gaseous fuel in open hearth furnaces. That is to say, in the process of this invention a larger quantity of gas can be burned per unit of time than in prior processes.

Having thus described my invention, what I claim is:

1. A heating process which comprises placing a charge of material to be heated on a furnace hearth, passing air over the charge in a generally horizontal direction, projecting fluid fuel downwardly toward and substantially perpendicular to the charge under substantial pressure from a plurality of points spaced along the path of travel of the air through the furnace, and burning the fuel while impinging on the charge.

2. A heating process which comprises introducing a charge of material to be heated into a furnace, passing combustion supporting medium in a generally horizontal direction over the charge, and blanketing the charge with flames generated on the charge by forcibly projecting, from a plurality of points spaced along the path of travel of said medium streams of gaseous fuel downwardly through said medium toward and substantially perpendicular to the charge.

3. A heating process which comprises placing a charge of material to be heated on a furnace hearth, passing air over the charge in a generally horizontal direction, projecting streams of gaseous fuel, from a plurality of points spaced along the path of travel of the air through the furnace downwardly toward and substantially perpendicular to the hearth under sufficient pressure to penetrate the moving current of air and to impinge flame against the charge, and burning the fuel over at least the major portion of the surface of the charge.

4. In the operation of open hearth furnaces, the method which comprises placing a charge of material to be heated on the furnace hearth, passing a combustion supporting medium in a generally horizontal direction over the charge, directing fluid fuel under substantial velocity downwardly from the furnace roof toward and substantially perpendicular to the hearth, the fuel being directed downwardly in a plurality of streams spaced along the path of travel of said medium through the furnace, and burning the fuel while impinging on the charge.

5. A heating process which comprises placing a charge of material to be heated on a furnace hearth, passing a rapidly moving stream of air through the furnace in a generally horizontal direction over the charge, introducing fuel gas to the upper portion of the furnace at spaced points in the direction of flow of said stream through the furnace and directing the same downwardly through the stream of air under sufficient pressure to impinge substantially perpendicularly upon the charge, and burning the gas while thus impinging on the charge.

6. In the operation of open hearth furnaces wherein gaseous fuel is burned adjacent the charge on the hearth, the improvement which comprises passing a combustion supporting medium in a generally horizontal direction through the furnace, and forcibly projecting the gas downwardly from the upper portion of the furnace toward and substantially perpendicular to the hearth in a plurality of jets spaced in the direction of flow of said medium through the furnace.

KENNETH M. SIMPSON.